United States Patent
Ireland et al.

(10) Patent No.: US 11,088,739 B1
(45) Date of Patent: Aug. 10, 2021

(54) WIRELESS COMMUNICATION THROUGH A PHYSICAL BARRIER USING BEAMFORMING POWER CONTROL

(71) Applicant: T-MOBILE INNOVATIONS LLC, Overland Park, KS (US)

(72) Inventors: Kelley W. Ireland, Overland Park, KS (US); Sreekar Marupaduga, Overland Park, KS (US); Matthew Starzec, Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/990,563

(22) Filed: Aug. 11, 2020

(51) Int. Cl.
| | |
|---|---|
| H04B 7/02 | (2018.01) |
| H04B 7/0456 | (2017.01) |
| H04W 52/24 | (2009.01) |
| H04W 72/04 | (2009.01) |
| H04W 52/14 | (2009.01) |
| H04B 7/0426 | (2017.01) |

(52) U.S. Cl.
CPC .......... *H04B 7/0465* (2013.01); *H04B 7/043* (2013.01); *H04B 7/0482* (2013.01); *H04W 52/146* (2013.01); *H04W 52/242* (2013.01); *H04W 72/0473* (2013.01)

(58) Field of Classification Search
CPC .............................. H04B 7/0805; H04W 16/28
USPC .................................................. 375/260, 267
See application file for complete search history.

(56) References Cited

U.S. PATENT DOCUMENTS

| | | | |
|---|---|---|---|
| 7,317,708 B2 | 1/2008 | Moon et al. | |
| 7,577,398 B2 | 8/2009 | Judd et al. | |
| 8,358,970 B2 | 1/2013 | Judd et al. | |
| 8,559,990 B2* | 10/2013 | Jiang ................... | H04L 25/0204 455/500 |
| 8,884,832 B2 | 11/2014 | Huang et al. | |
| 9,711,868 B2 | 7/2017 | Scheucher | |
| 2013/0155891 A1* | 6/2013 | Dinan ............... | H04W 36/0058 370/252 |
| 2018/0192375 A1* | 7/2018 | Xia ........................ | H04B 7/088 |
| 2019/0349867 A1* | 11/2019 | MolavianJazi ....... | H04W 52/40 |
| 2021/0014900 A1* | 1/2021 | Lei ..................... | H04W 74/0833 |

\* cited by examiner

*Primary Examiner* — Don N Vo

(57) ABSTRACT

In a wireless communication system that traverses a physical barrier, a serving transceiver determines a downlink beamforming matrix. The serving transceiver determines a downlink power based on the downlink beamforming matrix. A network transceiver beamforms and amplifies a downlink signal based on the downlink beamforming matrix and downlink power. The network transceiver wirelessly transfers the downlink signal through the physical barrier to the serving transceiver. Contemporaneously, the network transceiver determines an uplink beamforming matrix. The network transceiver determines an uplink power based on the uplink beamforming matrix. The serving transceiver beamforms and amplifies an uplink signal based on the uplink beamforming matrix and uplink power. The serving transceiver wirelessly transfers the uplink signal through the physical barrier to the network transceiver.

20 Claims, 9 Drawing Sheets

US 11,088,739 B1

WIRELESS COMMUNICATION THROUGH A PHYSICAL BARRIER USING BEAMFORMING POWER CONTROL

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter-Wave (MMW), Long Term Evolution (LTE), Institute of Electrical and Electronic Engineers (IEEE) 802.11 (WIFI), and Low-Power Wide Area Network (LP-WAN).

To manage uplink interference, a wireless user device transmits uplink signals at power levels that are controlled by the wireless access node. The wireless access node allocates enough uplink transmit power to traverse the distance from the wireless user device to the wireless access node. The wireless access node also attempts to equalize the uplink receive power for all wireless user devices. On the downlink, the wireless access node transmits beamformed downlink signals to the wireless user device. The wireless access node allocates enough downlink transmit power to extend and narrow the main beamforming lobe beyond the wireless user device.

The wireless user devices do not operate as well when exchanging wireless signals with the wireless access nodes through walls, ceilings, and some other physical barriers. The wireless user devices and access nodes increase their transmit power to overcome the physical barriers but unwanted interference increases as a result. Indoor/outdoor wireless repeater system are often used to overcome the physical barriers. An indoor wireless unit serves both wireless and wireline user devices. The indoor wireless unit wirelessly communicates with an outdoor wireless unit through the walls, ceilings, and other physical barriers. The outdoor wireless unit wirelessly communicates with a wireless access node in a wireless communication network. Unfortunately, the amount of transmit power available to the indoor and outdoor wireless units may not be adequate to overcome significant physical barriers. Moreover, the wireless repeater systems do not efficiently and effectively use beamforming and power control to optimize their transmit power.

TECHNICAL OVERVIEW

In a wireless communication system that traverses a physical barrier, a serving transceiver determines a downlink beamforming matrix. The serving transceiver determines downlink power based on the downlink beamforming matrix. The serving transceiver wirelessly indicates the downlink beamforming matrix and the downlink power to a network transceiver. The network transceiver wirelessly exchanges user data with a wireless communication network. The network transceiver beamforms and amplifies a downlink signal that transports the user data based on the downlink beamforming matrix and the downlink power. The network transceiver wirelessly transfers the downlink signal through the physical barrier to the serving transceiver. The serving transceiver exchanges the user data with user communication devices. Contemporaneously, the network transceiver determines an uplink beamforming matrix. The network transceiver determines an uplink power based on the uplink beamforming matrix. The network transceiver wirelessly indicates the uplink beamforming matrix and the uplink power to the serving transceiver. The serving transceiver beamforms and amplifies an uplink signal that transports user data based on the uplink beamforming matrix and the uplink power. The serving transceiver wirelessly transfers the uplink signal through the physical barrier to the network transceiver.

DETAILED DESCRIPTION

Figure 1:
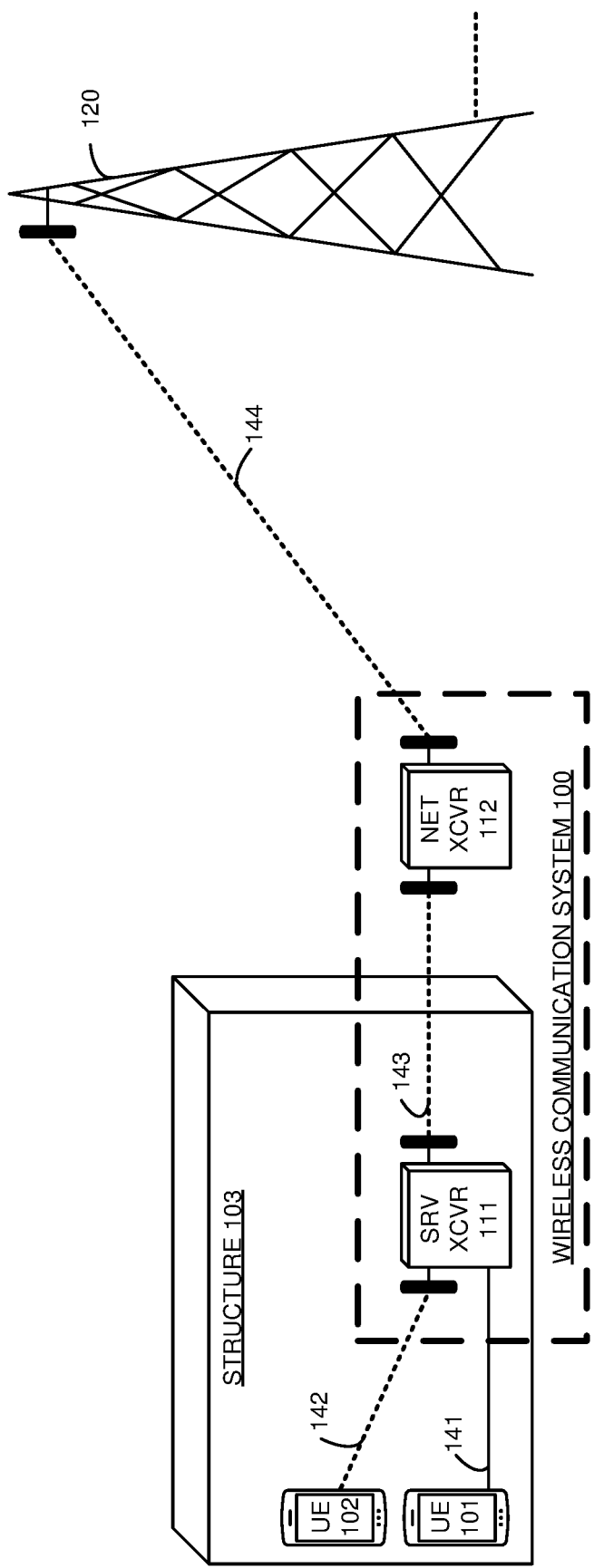
FIG. 1 illustrates a wireless communication system to wirelessly communicate through a structure using beamforming power control.

FIG. 1 illustrates wireless communication system 100 to wirelessly communicate through a structure 103 using beamforming power control. Wireless communication system 100 delivers wireless data services like internet-access, media-conferencing, augmented-reality, machine-control, and/or some other wireless networking product. Wireless communication system 100 comprises serving transceiver (SRV XCVR) 111 and network transceiver (NET XCVR) 112.

Various examples of network operation and configuration are described herein. In some examples, serving transceiver 111 detects downlink signal parameters and determines a downlink beamforming matrix indicator and a downlink power indicator based on the downlink signal parameters. Serving transceiver 111 wirelessly transfers the downlink beamforming matrix indicator and the downlink power indicator to network transceiver 112. Network transceiver 112 wirelessly exchanges user data with wireless communication network 120. Network transceiver 112 beamforms a downlink signal based on the downlink beamforming indicator. Network transceiver 112 amplifies the downlink signal based on the downlink power indicator. Network transceiver 112 wirelessly transfers the beamformed/amplified downlink signal which transports user data to serving transceiver 111. Serving transceiver 111 transfers the user data to UEs 101-102. Network transceiver 112 detects uplink signal parameters. Network transceiver 112 determines an uplink beamforming matrix indicator and an uplink power indicator based on the uplink signal parameters. Network transceiver 112 wirelessly transfers the uplink beamforming matrix indicator and the uplink power indicator to serving transceiver 111. Serving transceiver 111 exchanges user data with UEs 101-102. Serving transceiver 111 beamforms an uplink signal based on the uplink beamforming indicator. Serving transceiver 111 amplifies the uplink signal based on the uplink power indicator. Serving transceiver 111 wirelessly transfers the beamformed and amplified uplink data signal which transports user data to network transceiver 112. Network transceiver 112 wirelessly transfers user data to the wireless communication network.

Advantageously, the transmit power for transceivers 111-112 is optimized to overcome structure 103. Moreover, wireless communication system 100 efficiently and effectively uses beamforming and power control to optimize the transmit power.

In some of the examples, transceivers 111-112 determine the power indicators based on the beamforming matrix indicators. Transceivers 111-112 select the power indicators based on the beamforming apertures associated with the beamforming matrix indicators—smaller apertures may use more transmit power. In some of the examples, transceivers 111-112 wirelessly broadcast pilot signals and then detect each other based on the pilot signals. In some of the examples, transceivers 111-112 may store hardware authentication codes. Transceivers 111-112 generate random codes and hash their hardware authentication codes with the random codes to generate code hashes. Transceivers 111-112 wirelessly exchange their random codes and code hashes. Transceivers 111-112 re-hash the authentication codes and the random codes to regenerate and match the code hashes to authenticate each other.

In structure 103, serving transceiver 111 is coupled to User Equipment (UEs) 101-102 over user links 141-142. Serving transceiver 111 is coupled to network transceiver (NET XCVR) 112 over system link 143 that traverses the physical barriers of structure 103. Network transceiver 112 is coupled to wireless communication network 120 over network link 144. User link 141 uses metal, glass, or some other media. User link 141 uses Institute of Electrical and Electronic Engineers (IEEE) 802.3 (ENET), Time Division Multiplex (TDM), Data Over Cable System Interface Specification (DOCSIS), Internet Protocol (IP), and/or some other data networking protocol. Links 142-144 use Radio Access Technologies (RATs) like Fifth Generation New Radio (5GNR), Millimeter-Wave (MMW), Long Term Evolution (LTE), Institute of Electrical and Electronic Engineers (IEEE) 802.11 (WIFI), Low-Power Wide Area Network (LP-WAN), and/or some other wireless networking protocol. Links 142-144 use electromagnetic frequencies in the low-band, mid-band, high-band, or some other portion of the electromagnetic spectrum.

UE 101 comprises microprocessors, memories, software, transceivers, bus circuitry, and the like. UE 102, transceivers 111-112, and network 120 comprise antennas, amplifiers, filters, modulation, analog/digital interfaces, microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication system 100 as described herein.

Structure 103 could be a building, wall, berm, or some other physical barrier. UEs 101-102 are depicted as smartphones or tablets, but UEs 101-102 might comprise computers, robots, vehicles, or some other data appliances with data communication circuitry. Wireless communication network 120 is depicted as a radio tower, but wireless network 120 includes additional network elements and may take different physical forms.

Figure 2:
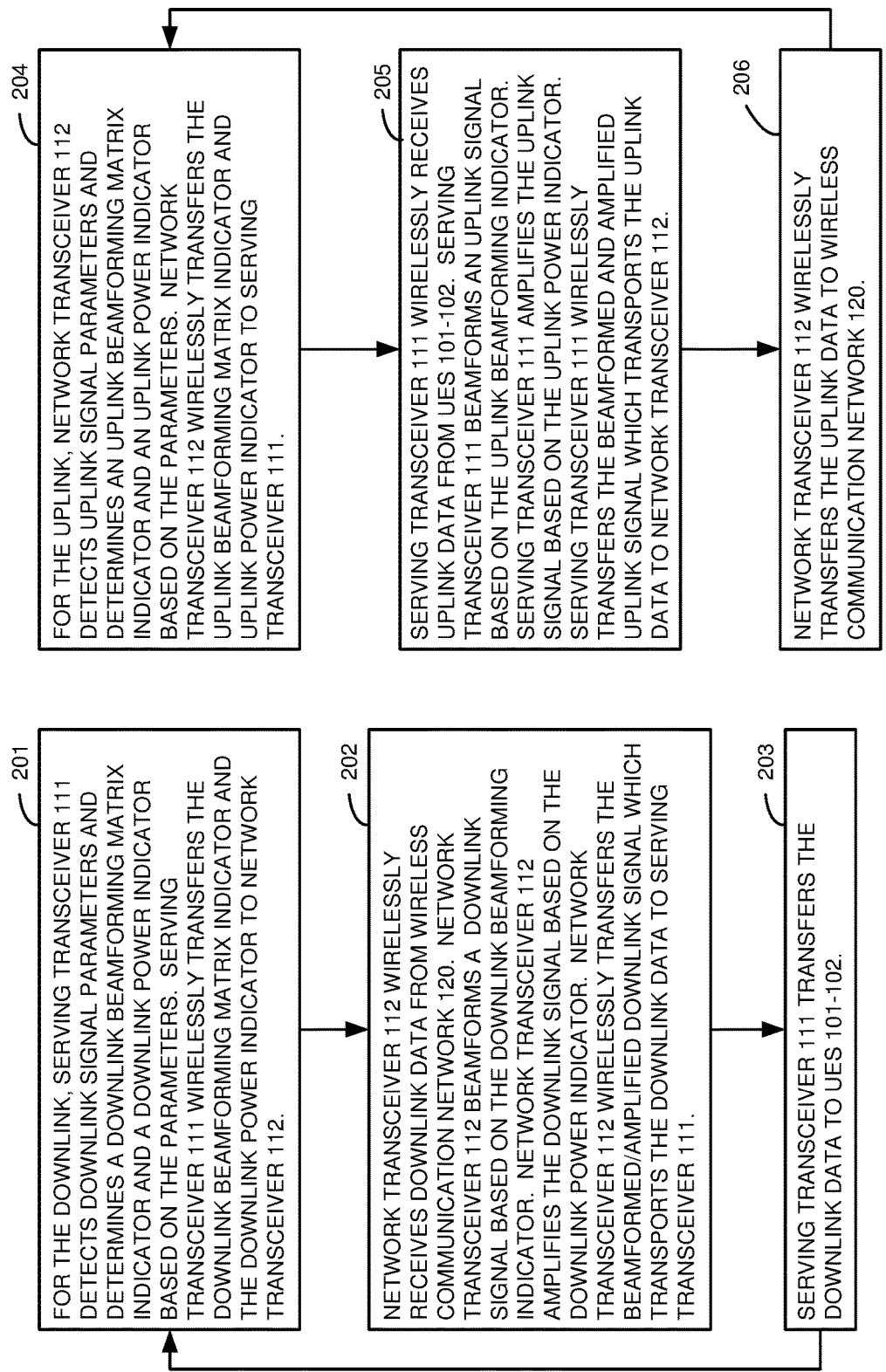
FIG. 2 illustrates an exemplary operation of the wireless communication system to wirelessly communicate through the structure using beamforming power control.

FIG. 2 illustrates an exemplary operation of wireless communication system 100 to wirelessly communicate through structure 103 using beamforming power control. Serving transceiver 111 detects downlink signal parameters and determines a downlink beamforming matrix indicator and a downlink power indicator based on the downlink signal parameters (201). Serving transceiver 111 wirelessly transfers the downlink beamforming matrix indicator and the downlink power indicator to network transceiver 112 (201).

Network transceiver 112 wirelessly receives downlink data from wireless communication network 120 (202). Network transceiver 112 beamforms a downlink signal for the data based on the downlink beamforming indicator (202). Network transceiver 112 amplifies the downlink signal based on the downlink power indicator (202). Network transceiver 112 wirelessly transfers the beamformed/amplified downlink signal which transports the downlink data to serving transceiver 111 (202). Serving transceiver 111 transfers the downlink data to UEs 101-102 (203).

Contemporaneously, network transceiver 112 detects uplink signal parameters and determines an uplink beamforming matrix indicator and an uplink power indicator based on the uplink signal parameters (204). Network transceiver 112 wirelessly transfers the uplink beamforming matrix indicator and the uplink power indicator to serving transceiver 111 (204).

Serving transceiver 111 wirelessly receives an uplink data from UEs 101-102 (205). Serving transceiver 111 beamforms an uplink signal based on the uplink beamforming indicator (205). Serving transceiver 111 amplifies the uplink signal based on the uplink power indicator (205). Serving transceiver 111 wirelessly transfers the beamformed and amplified uplink signal which transport the uplink data to network transceiver 112 (205). Network transceiver 112 wirelessly transfers the uplink data to the wireless communication network 120 (206).

Figure 3:
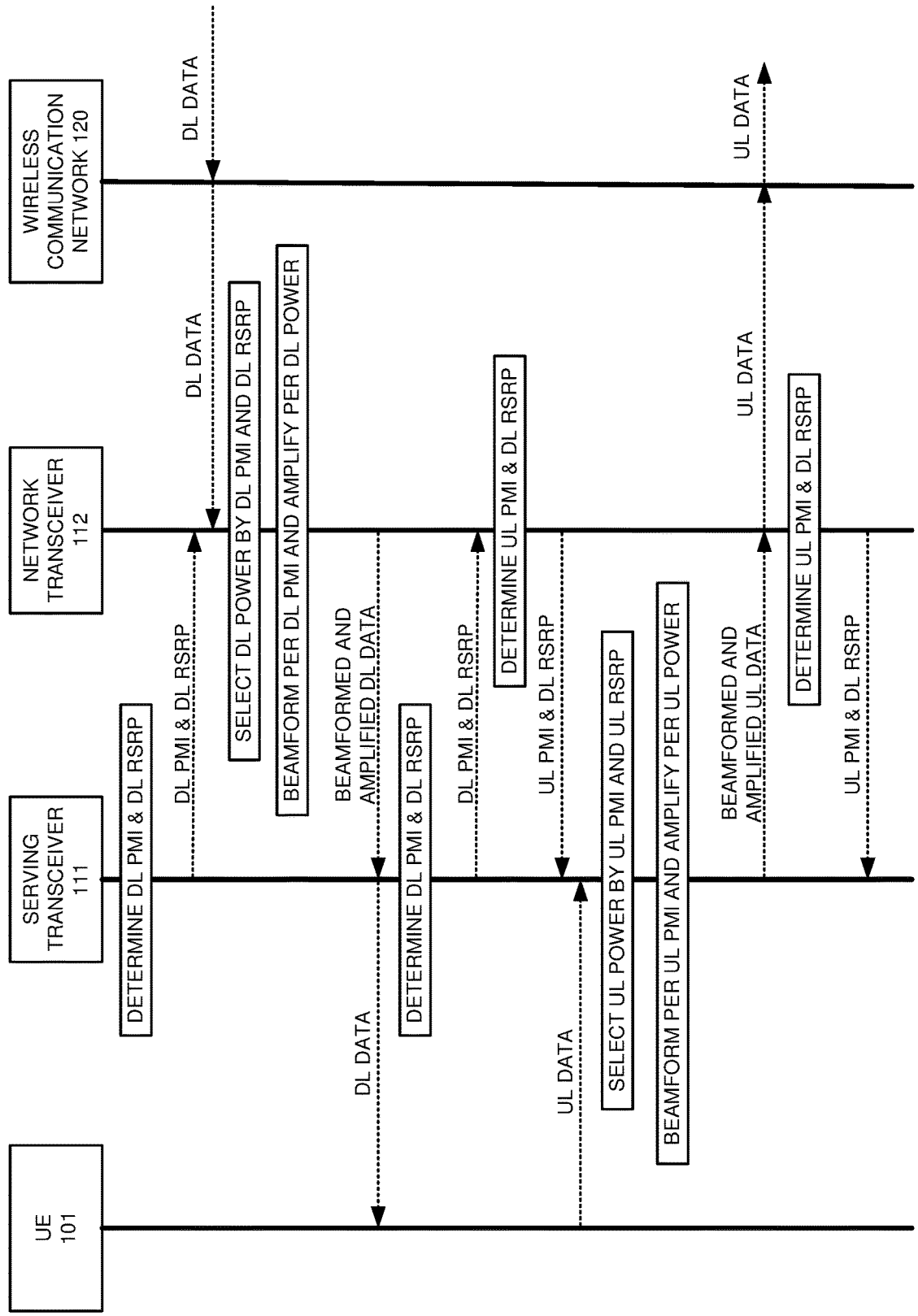
FIG. 3 illustrates an exemplary operation of the wireless communication system to wirelessly communicate through the structure using beamforming power control.

FIG. 3 illustrates an exemplary operation of wireless communication system 100 to wirelessly communicate through structure 103 using beamforming power control. In this example, the beamforming matrix indicators comprise Precoding Matrix Indicators (PMIs) and the power indicators comprise Receive Signal Receive Power (RSRP). Serving transceiver 111 determines a downlink (downlink) PMI and RSRP. Serving transceiver 111 wirelessly transfers the downlink PMI and RSRP to network transceiver 112.

For the downlink (DL), network transceiver 112 wirelessly receives downlink data from wireless communication network 120. Network transceiver 112 beamforms the downlink data based on the downlink PMI. Network transceiver 112 amplifies the downlink data based on the downlink RSRP and PMI. Network transceiver 112 wirelessly transfers the beamformed/amplified downlink data to serving transceiver 111. Serving transceiver 111 transfers the downlink data to UE 101. Serving transceiver 111 determines a new downlink PMI and a RSRP based on the received downlink data. The downlink operation repeats using the new downlink indicators.

For the uplink (UL), network transceiver 112 determines an uplink PMI and an uplink RSRP. Network transceiver wirelessly transfers the uplink PMI and uplink RSRP to serving transceiver 111. Serving transceiver 111 receives uplink data from UE 101. Serving transceiver 111 beamforms the uplink data based on the uplink PMI. Serving transceiver 111 amplifies the uplink data based on the uplink RSRP and PMI. Serving transceiver 111 wirelessly transfers the beamformed and amplified uplink data to network transceiver 112. Network transceiver 112 wirelessly transfers the uplink data to the wireless communication network. Network transceiver 112 determines a new uplink PMI and a new uplink RSRP based on the uplink data. The uplink operation repeats using the new uplink indicators.

Figure 4:
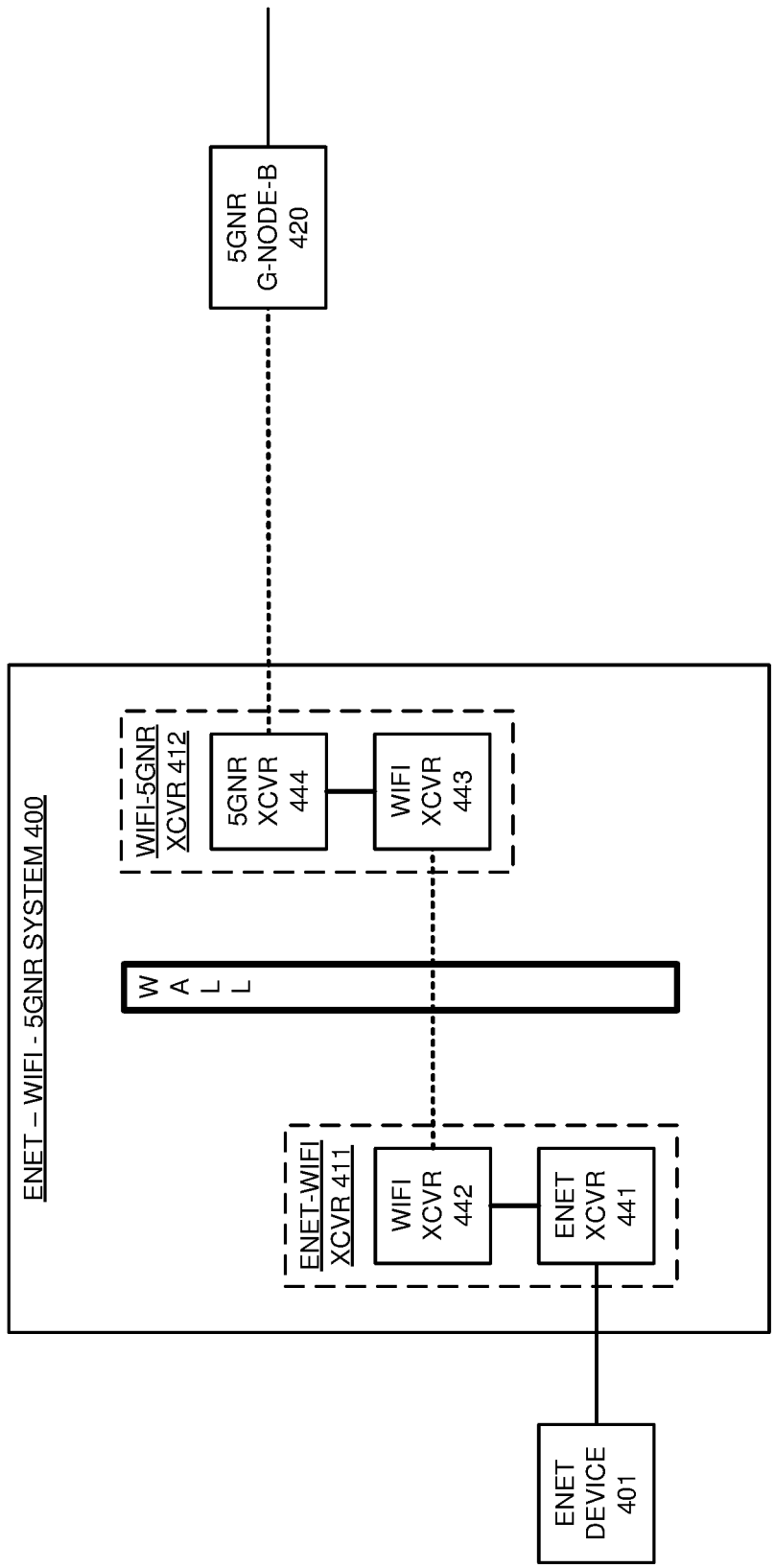
FIG. 4 illustrates an Institute of Electrical and Electronic Engineers (IEEE) 802.3-IEEE 802.11—Fifth Generation New Radio (ENET-WIFI-5GNR) system to wirelessly communicate through a wall using WIFI beamforming power control.

FIG. 4 illustrates Institute of Electrical and Electronic Engineer (IEEE) 802.3-IEEE 802.11—Fifth Generation New Radio (ENET-WIFI-5GNR) system 400 that wirelessly communicates through a wall using WIFI beamforming power control. ENET-WIFI-5GNR communication system 400 comprises an example of wireless communication system 100, although system 100 may differ. ENET-WIFI-5GNR communication system 400 comprises ENET-WIFI transceiver 411 and WIFI-5GNR transceiver 412. ENET-WIFI transceiver 411 comprises ENET transceiver 441 and WIFI transceiver 442. WIFI-5GNR transceiver 412 comprises WIFI transceiver 443 and 5GNR transceiver 444. ENET device 401 is coupled to ENET transceiver 441 over an ENET link. WIFI transceiver 442 is wirelessly coupled to WIFI transceiver 443 over a beamformed and amplified WIFI link that traverses the wall. 5GNR transceiver 444 is coupled to 5GNR gNodeB 420 over a 5GNR link.

WIFI transceivers 442-443 and 5GNR gNodeB 420 wirelessly broadcast pilot signals. WIFI transceivers 442-443 wirelessly detect each other based on their pilot signals. 5GNR transceiver 444 wirelessly detects 5GNR gNodeB 420 based on its pilot signal. WIFI transceivers 442-443 store read-only hardware trust codes in their non-volatile memories. WIFI transceiver 442 generates a random code and hashes its hardware trust code with the random code to generate a hash result. WIFI transceiver 442 transfers the random code and its hash result to WIFI transceiver 443. WIFI transceiver 443 hashes its version of the hardware trust code with the random code to regenerate the hash result. WIFI transceiver 443 interacts with WIFI transceivers that send matching hash results but ignores any WIFI transceivers that send mis-matching and untrusted hash results.

ENET device 401 and ENET transceiver 441 exchange user data over ENET signals. ENET transceiver 441 and WIFI transceiver 442 exchange the user data over ENET signals. WIFI transceiver 442 and WIFI transceiver 443 wirelessly exchange the user data over WIFI signals. WIFI transceiver 443 and 5GNR transceiver 444 exchanges the user data over X2 signals. 5GNR transceiver 444 and 5GNR gNodeB 420 wirelessly exchange the user data over 5GNR signals. 5GNR gNodeB 420 exchanges the user data with other data systems over N3 and X2 signals.

WIFI transceiver 442 processes downlink WIFI signals to determine downlink WIFI signal power and other radio parameters. WIFI transceiver 442 processes the downlink WIFI signal power and other parameters to select a downlink WIFI precoding matrix for WIFI transceiver 443. WIFI transceiver 442 transfers a downlink WIFI power indicator and the selected downlink WIFI precoding matrix to WIFI transceiver 443. WIFI transceiver 443 beamforms the downlink user data based on the downlink WIFI precoding matrix from WIFI transceiver 442. WIFI transceiver 443 amplifies downlink user data based on the downlink WIFI power indicator and the downlink WIFI precoding matrix from WIFI transceiver 442. In particular, WIFI transceiver 443 optimizes downlink power based on the downlink beamforming aperture of the selected downlink WIFI precoding matrix. WIFI transceiver 443 wirelessly transfers the amplified and beamformed user data to WIFI transceiver 442.

WIFI transceiver 443 processes uplink WIFI signals to determine uplink WIFI signal power and other radio parameters. WIFI transceiver 443 processes the uplink WIFI signal power and other parameters to select an uplink WIFI precoding matrix for WIFI transceiver 442. WIFI transceiver 443 transfers an uplink WIFI power indicator and the selected uplink WIFI precoding matrix to WIFI transceiver 442. WIFI transceiver 442 beamforms the uplink user data based on the selected uplink WIFI precoding matrix from WIFI transceiver 443. WIFI transceiver 442 amplifies uplink user data based on the uplink WIFI power indicator and uplink WIFI precoding matrix from WIFI transceiver 443. In particular, WIFI transceiver 442 optimizes uplink power based on the uplink beamforming aperture of the selected uplink WIFI precoding matrix. WIFI transceiver 442 wirelessly transfers the amplified and beamformed user data to WIFI transceiver 443.

WIFI transceiver 442 determines an uplink power target based on the reported uplink receive power. WIFI transceiver 442 increases the uplink power target when the uplink receive power is too low and decreases the uplink power target when the uplink receive power is too high. WIFI transceiver 442 determines a maximum uplink power based the selected uplink WIFI precoding matrix. When the uplink precoding matrix has a smaller uplink beamforming aperture, the maximum uplink power is larger. When the uplink precoding matrix has a larger uplink beamforming aperture, the maximum uplink power is smaller. WIFI transceiver 442 uses an uplink power level that corresponds to the lower of the uplink power target or the maximum uplink power.

WIFI transceiver 443 determines a downlink power target based on reported downlink receive power. WIFI transceiver 443 increases the downlink power target when the downlink receive power is too low and decreases the downlink power target when the downlink receive power is too high. WIFI transceiver 443 determines a maximum downlink power based the selected downlink WIFI precoding matrix. When the downlink precoding matrix has a smaller downlink beamforming aperture, the maximum downlink power is larger. When the downlink precoding matrix has a larger downlink beamforming aperture, the maximum downlink power is smaller. WIFI transceiver 443 uses a downlink power level that corresponds to the lower of the downlink power target and the maximum downlink power.

Figure 5:
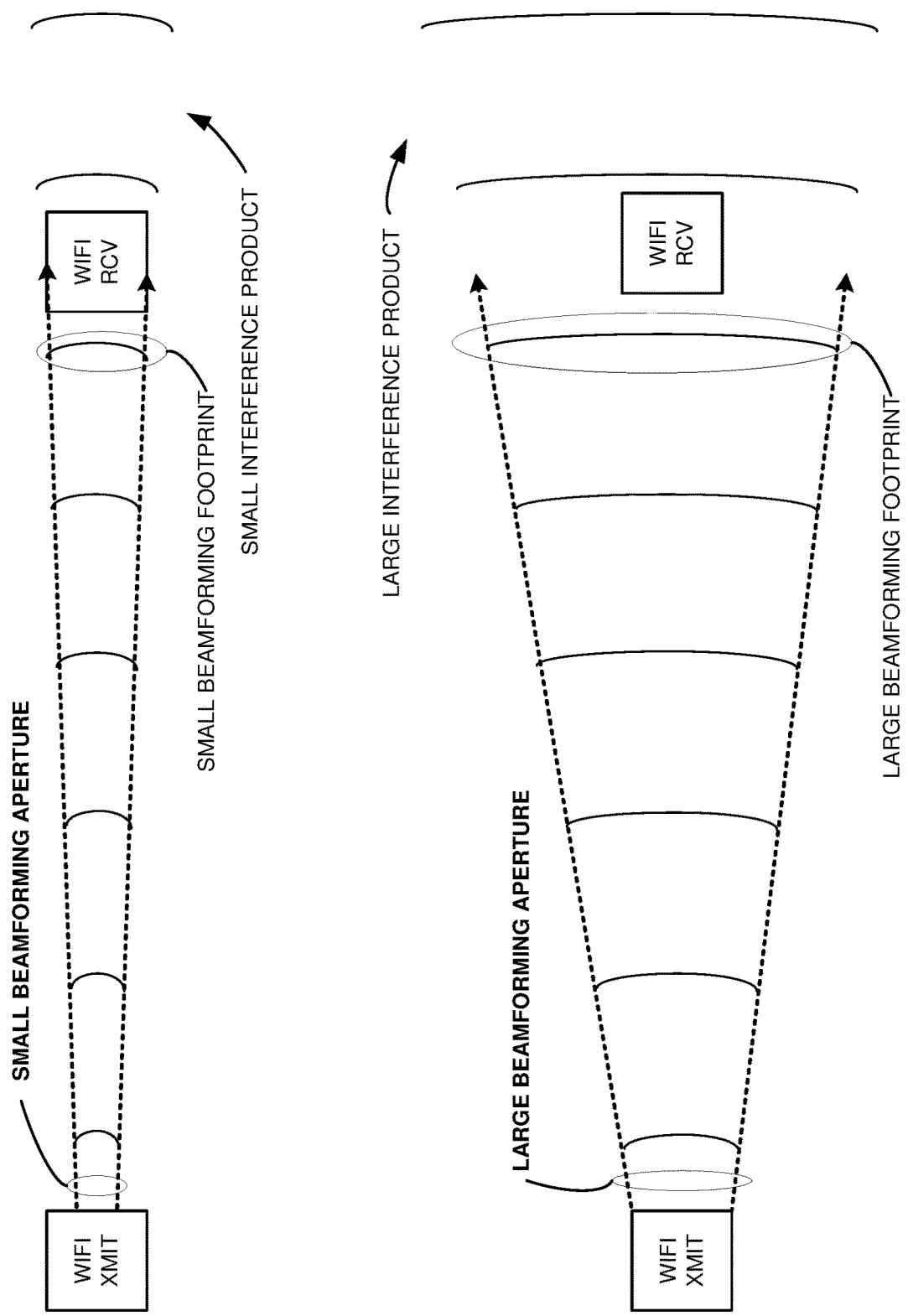
FIG. 5 illustrates wireless beamforming apertures, wireless beamforming footprints, and wireless beamforming interference products.

FIG. 5 illustrates wireless beamforming apertures, wireless beamforming footprints, and wireless beamforming interference products. The WIFI transmitters (XMIT) and the WIFI receivers (RCV) are representative of the transmitters and receivers in WIFI transceivers 442-443. The WIFI transmitters and receivers are usually pointed at one another by the operator or by motors. The WIFI transmitters may be equipped with physical waveguides like antenna horns, cans, and the like. The WIFI transmitters transfer null signals from select antenna elements to attenuate unwanted signal energy outside of the desired electromagnetic beam. The beamforming aperture comprises the clear opening for wireless transmission that is not nulled by physical waveguides or out-of-phase signals. The WIFI transmitter at the top of FIG. 5 uses a precoding matrix that has a small beamforming aperture. The smaller beamforming aperture has a small beamforming footprint at the WIFI receiver. The small beamforming aperture generates a small interference product beyond the WIFI receiver. The WIFI transmitter at the bottom of FIG. 5 uses a precoding matrix that has a large beamforming aperture. The large beamforming aperture has a large beamforming footprint at the WIFI receiver. The large beamforming aperture generates a large interference product beyond the WIFI receiver. Due to the smaller beamforming interference product, the WIFI transmitter at the top may use more transmit power than the WIFI transmitter at the bottom.

Figure 6:
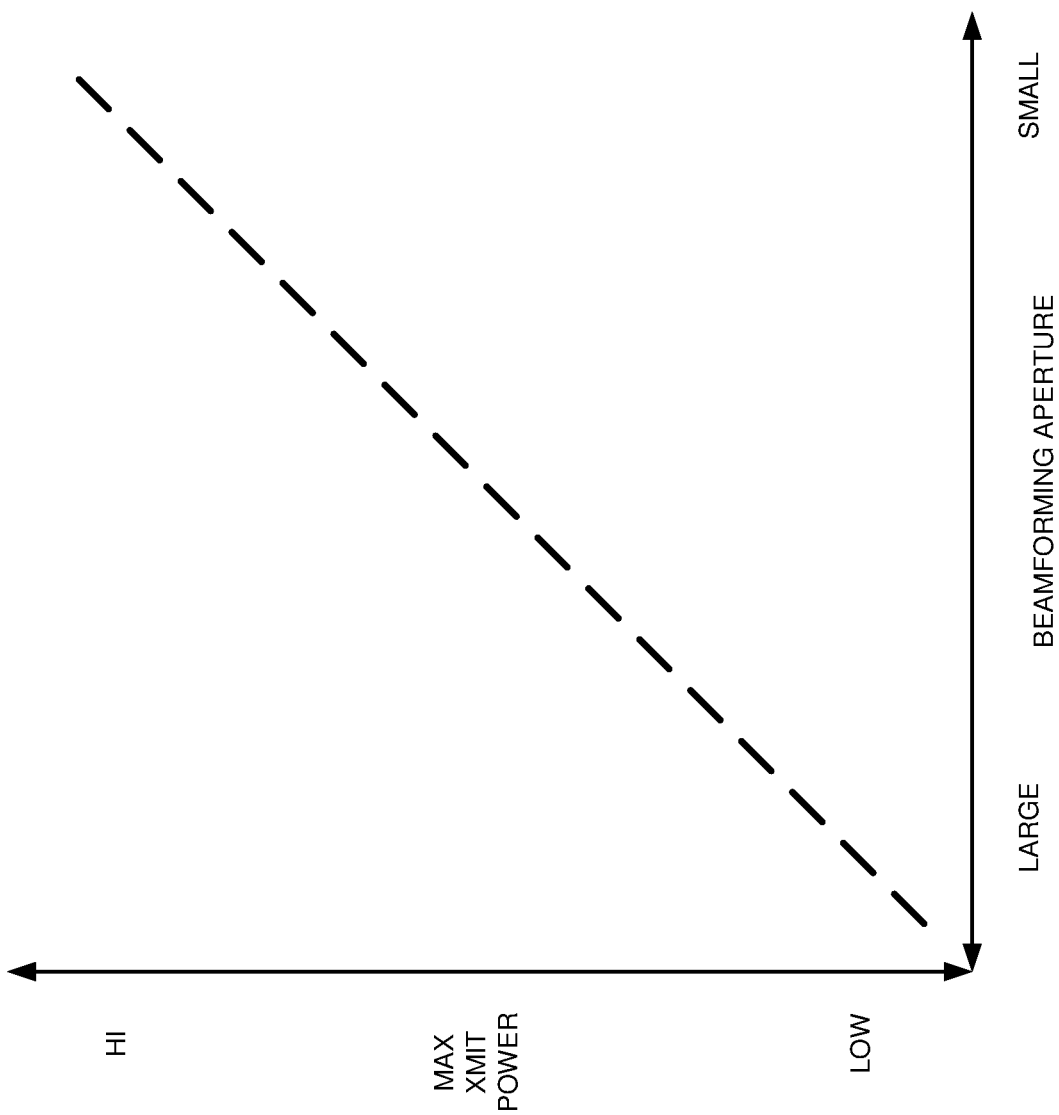
FIG. 6 illustrates the selection of maximum transmit power based on precoding matrix beamforming apertures.

FIG. 6 illustrates the selection of maximum transmit power based on precoding matrix beamforming aperture. The vertical axis represents maximum transmit power. The horizontal axis represents beamforming aperture. The dashed line represents the maximum transmit power value for the beamforming aperture of the selected precoding matrix. A small beamforming aperture correlates to a high maximum transmit power due to its small interference product. A large beamforming aperture correlates to a low maximum transmit power due to its large interference product. The graph of FIG. 6 may be reduced to a data structure that is hosted by WIFI transceivers 411-412. WIFI transceivers 411-412 could use the data structure to control the maximum transmit power based on the select precoding matrix and its corresponding beamforming aperture. WIFI transceivers 411-412 then optimize their transmit power within the limit of the selected maximum transmit power.

Figure 7:
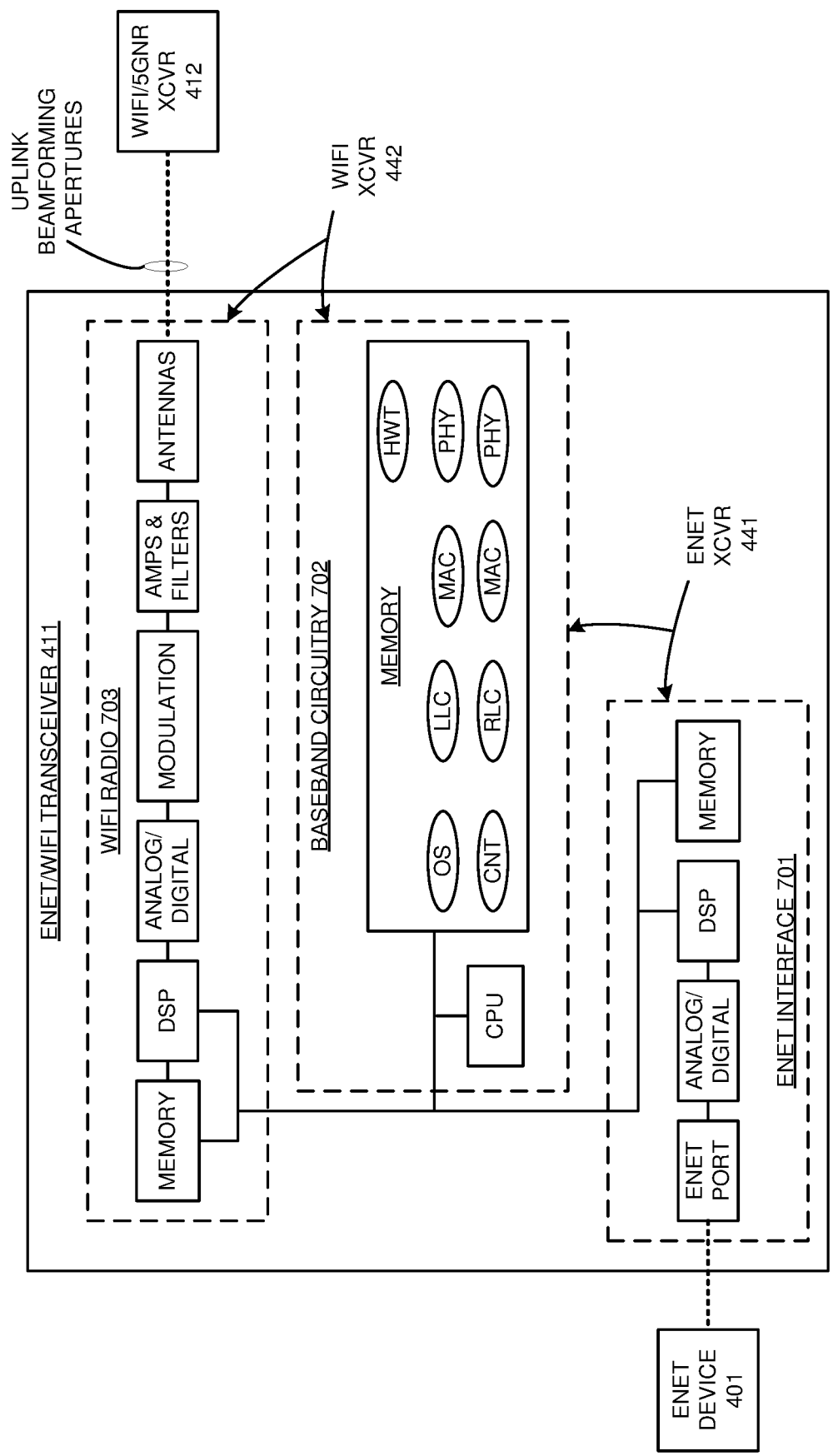
FIG. 7 illustrates an ENET-WIFI transceiver to wirelessly communicate through the wall using WIFI beamforming power control.

FIG. 7 illustrates ENET-WIFI transceiver 411 to wirelessly communicate through the wall using WIFI beamforming power control. ENET-WIFI transceiver 411 comprises an example of serving transceiver 111, although serving transceiver 111 may differ. ENET-WIFI transceiver 411 comprises ENET interface 701, baseband circuitry 702, and WIFI radio 703. ENET interface 701 comprises an ENET port, analog-to-digital interface, DSP, and memory that are coupled over bus circuitry. Baseband circuitry 702 comprises memory, CPU, and transceivers that are coupled over bus circuitry. WIFI radio 703 comprises antennas, amplifiers, filters, modulation, analog-to-digital interfaces, DSP, memory, and transceivers that are coupled over bus circuitry. ENET interface 701 and portions of baseband circuitry 702 form ENET transceiver 441. WIFI radio 703 and portions of baseband circuitry 702 form WIFI transceiver 442.

In baseband circuitry 702, the memory stores operating systems and network applications like ENET and WIFI Physical Layers (PHY), ENET and WIFI Media Access Controls (MAC), ENET Logical Link Control (LLC), WIFI Radio Link Control (RLC), and system controller (CNT). A secure read-only portion of the memory stores Hardware Trust Codes (HWT). The CPU in baseband circuitry 702 executes the operating systems, PHY, MAC, LLC, RLC, and system controller to exchange user signaling and user data with ENET device 401 over ENET interface 701 and to exchange corresponding user signaling and user data with WIFI-5GNR transceiver 412 over WIFI radio 703.

ENET interface 701 receives uplink ENET signals from ENET device 401 that transport uplink user signaling and uplink user data. The ENET port transfers corresponding electrical uplink signals through the analog/digital interfaces that convert the analog uplink signals into digital uplink signals for the DSPs. The DSP in interface 701 and the CPU in circuitry 702 execute the ENET network applications to process the uplink signals and recover the uplink user signaling and the uplink user data. The CPU in circuitry 702 executes the WIFI network applications to process the uplink user signaling and uplink user data and generate corresponding uplink WIFI symbols that carry uplink user signaling and uplink user data. The uplink WIFI symbols are formed based on the uplink precoding matrix selected by transceiver 412. The uplink WIFI symbols implement the uplink power levels optimized by transceiver 411. In WIFI radio 703, the DSP processes the uplink WIFI symbols to generate corresponding digital signals for the analog-to-digital interfaces. The analog-to-digital interfaces convert the digital uplink signals into analog uplink signals for modulation. Modulation up-converts the uplink signals to their carrier frequency. The amplifiers boost the modulated uplink signals based on the uplink power levels in the uplink symbols. The filters attenuate unwanted out-of-band energy. The filters transfer the filtered uplink signals through duplexers to the antennas. The electrical uplink signals drive the antennas to emit the amplified and beamformed WIFI signals that transport the uplink user signaling and data to WIFI-5GNR transceiver 412.

In WIFI radio 703, the antennas receive downlink WIFI signals from transceiver 412 that transport downlink user signaling and data. The antennas transfer corresponding electrical downlink signals through duplexers to the amplifiers. The amplifiers boost the received downlink signals for filters which attenuate unwanted energy. Demodulators down-convert the downlink signals from their carrier frequency. The analog/digital interfaces convert the analog downlink signals into digital downlink signals for the DSPs. The DSPs recovers downlink symbols from the downlink digital signals. The CPUs execute the network applications to process the downlink symbols and recover the downlink user signaling and the downlink user data. The network applications detect downlink power levels and other signal parameters. The network applications select downlink precoding matrices for transceiver 412. The ENET network applications process the downlink user signaling and the downlink user data to generate corresponding downlink digital signals for the analog-to-digital interfaces. The analog-to-digital interfaces convert the downlink digital signals into analog downlink signals. The ENET port transfers the downlink ENET signaling and downlink ENET data to ENET device 401.

The WIFI PHY processes received downlink WIFI signals to detect downlink receive power and other signal parameters. The WIFI PHY selects a downlink WIFI precoding matrix for transceiver 412 based on the downlink receive power and the other signal parameters. The WIFI PHY in transceiver 411 indicates the selected downlink WIFI precoding matrix to the WIFI PHY in transceiver 412. The WIFI MAC in transceiver 411 indicates the detected downlink receive power to the WIFI MAC in transceiver 412. The WIFI PHY in transceiver 411 receives and implements an uplink WIFI precoding matrix indicated by the WIFI PHY in transceiver 412. The different uplink WIFI precoding matrices have different uplink beamforming apertures. The WIFI MAC in transceiver 411 receives uplink receive power reports from the WIFI MAC in transceiver 412. The WIFI MAC in transceiver 411 selects an uplink power target based on the reported uplink receive power. The WIFI MAC may then reduce the uplink power target if needed to the maximum transmit power for the uplink beamforming aperture of the selected uplink WIFI precoding matrix. The WIFI MAC uses the resulting transmit power level for the uplink transmission.

The WIFI applications in baseband circuitry 702 broadcast a pilot signal over WIFI radio 703 for detection by transceiver 412. The system controller application in circuitry 702 generates a random code and hashes its own read-only hardware trust code with the random code to generate a hash result. The system controller application transfers the random code and the hash result to transceiver 412 over radio 703 to establish hardware-trust. The system controller application receives another random code and hash result from transceiver 412 over radio 703. The system controller application in circuitry 702 hashes the read-only hardware trust code for transceiver 412 with the random code to generate a hash result. The system controller application establishes hardware-trust for transceiver 412 when the hash results match. The system controller application stops interactions with WIFI transceivers that fail to establish hardware trust.

Figure 8:
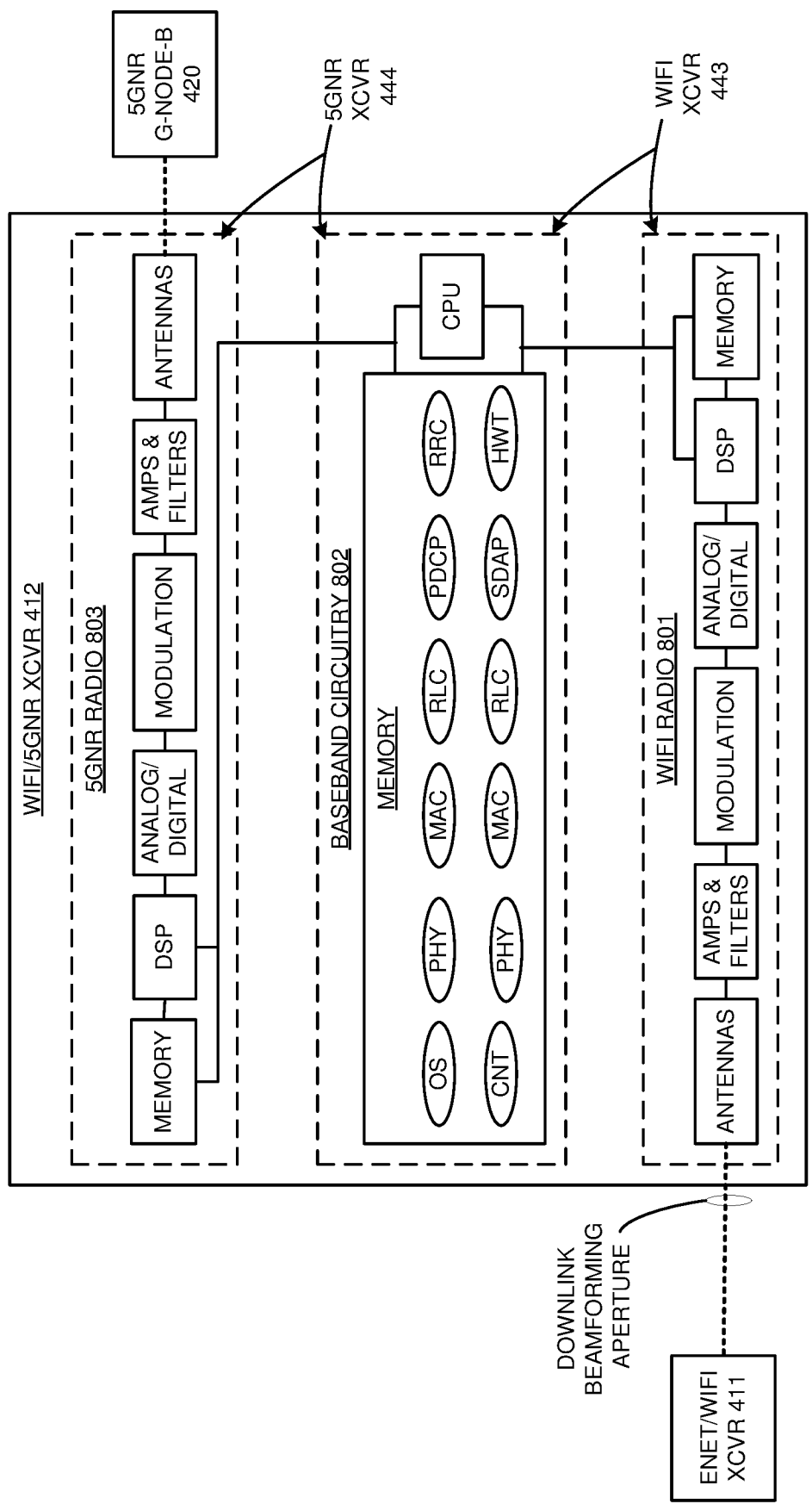
FIG. 8 illustrates a WIFI-5GNR transceiver to wirelessly communicate through the wall using WIFI beamforming power control.

FIG. 8 illustrates WIFI-5GNR transceiver 412 to wirelessly communicate through the wall using WIFI beamforming power control. WIFI-5GNR transceiver 412 comprises an example of network transceiver 112, although network transceiver 112 may differ. WIFI-5GNR transceiver 412 comprises WIFI radio 801, baseband circuitry 802, and 5GNR radio 803. Radios 801 and 803 comprise antennas, amplifiers, filters, modulation, analog-to-digital interfaces, DSP, memory, and transceivers that are coupled over bus circuitry. Baseband circuitry 802 comprises memory, CPU, and transceivers that are coupled over bus circuitry. WIFI radio 801 and portions of baseband circuitry 802 form WIFI transceiver 443. 5GNR radio 803 and portions of baseband circuitry 802 form 5GNR transceiver 444.

In baseband circuitry 802, the memory stores operating systems and network applications like WIFI and 5GNR PHY, WIFI and 5GNR MAC, WIFI and 5GNR RLC, 5GNR Packet Data Convergence Protocol (PDCP), 5GNR Service Data Adaption Protocol (SDAP), 5GNR Radio Resource Control (RRC), and a system controller (CNT). A secure read-only portion of the memory stores Hardware Trust Codes (HWT). The CPU in baseband circuitry 702 executes the operating systems, WIFI PHY, WIFI MAC, WIFI RLC, and system controller to exchange WIFI signals with transceiver 411 over WIFI radio 801. The CPU in baseband circuitry 702 executes the operating systems, 5GNR PHY, 5GNR MAC, 5GNR RLC, 5GNR PDCP, 5GNR SDAP, 5GNR RRC, and system controller to exchange 5GNR signals with 5GNR gNodeB 420 over 5GNR radio 803.

In WIFI radio 801, the antennas receive uplink WIFI signals from transceiver 411 that transport uplink user signaling and uplink user data. The antennas transfer corresponding electrical uplink signals through duplexers to the amplifiers. The amplifiers boost the received uplink signals for filters which attenuate unwanted energy. Demodulators down-convert the uplink signals from their carrier frequency. The analog/digital interfaces convert the analog uplink signals into digital uplink signals for the DSPs. The DSPs recover uplink symbols from the uplink digital signals. The CPUs execute the network applications to process the uplink symbols and recover the uplink user signaling and the uplink user data. The network applications select uplink precoding matrices and detect uplink power for transceiver 411. The CPU in circuitry 802 executes the 5GNR network applications to process the uplink user signaling and uplink user data and generate corresponding uplink 5GNR symbols that carry uplink 5GNR signaling and uplink 5GNR data. In 5GNR radio 803, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink signals to their carrier frequency. The amplifiers boost the modulated uplink signals based on the power control information in the uplink symbols. The filters attenuate unwanted out-of-band energy. The filters transfer the filtered uplink signals through duplexers to the antennas. The electrical uplink signals drive the antennas to emit 5GNR signals that transport the uplink 5GNR signaling and uplink 5GNR data to 5GNR gNodeB 420.

In 5GNR radio 803, the antennas receive downlink 5GNR signals from 5GNR gNodeB 420 that transport downlink 5GNR signaling and downlink 5GNR data. The antennas transfer corresponding electrical downlink signals through duplexers to the amplifiers. The amplifiers boost the received downlink signals for filters which attenuate unwanted energy. Demodulators down-convert the downlink signals from their carrier frequency. The analog/digital interfaces convert the analog downlink signals into digital downlink signals for the DSPs. The DSPs recovers downlink symbols from the downlink digital signals. The CPUs execute the 5GNR network applications to process the downlink symbols and recover downlink user signaling and downlink user data. The CPU in circuitry 802 executes the WIFI network applications to process the downlink user signaling and downlink user data and generate corresponding downlink WIFI symbols that carry downlink user signaling and data. The downlink WIFI symbols are formed based on the downlink precoding matrix selected by transceiver 411. The downlink WIFI symbols implement the downlink power levels. In WIFI radio 801, the DSP processes the downlink WIFI symbols to generate corresponding digital signals for the analog-to-digital interfaces. The analog-to-digital interfaces convert the digital uplink signals into analog uplink signals for modulation. Modulation up-converts the uplink signals to their carrier frequency. The amplifiers boost the modulated uplink signals based on the power control information in the downlink symbols. The filters attenuate unwanted out-of-band energy. The filters transfer the filtered downlink signals through duplexers to the antennas. The electrical downlink signals drive the antennas to emit the amplified and beamformed WIFI signals that transport the downlink user signaling and data to ENET-WIFI transceiver 411.

The WIFI PHY processes received uplink WIFI signals to detect uplink receive power and other signal parameters. The WIFI PHY selects an uplink WIFI precoding matrix for transceiver 411 based on the uplink receive power and the other signal parameters. The WIFI PHY in transceiver 412 indicates the selected uplink WIFI precoding matrix to the WIFI PHY in transceiver 411. The WIFI MAC in transceiver 412 indicates the detected uplink receive power to the WIFI MAC in transceiver 411. The WIFI PHY in transceiver 412 receives and implements the downlink WIFI precoding matrix indicated by the WIFI PHY in transceiver 411. The different downlink WIFI precoding matrices have different downlink beamforming apertures. The WIFI MAC in transceiver 412 receives downlink receive power reports from the WIFI MAC in transceiver 411. The WIFI MAC in transceiver 412 selects a downlink power target based on the reported downlink receive power. The WIFI MAC may then reduce the downlink power target if needed to the maximum transmit power for the downlink beamforming aperture of the selected downlink WIFI precoding matrix. The WIFI MAC uses the resulting transmit power level for the downlink transmission.

The WIFI applications in circuitry 802 broadcast a pilot signal over WIFI radio 801 for detection by transceiver 411. The system controller application in circuitry 802 generates a random code and hashes its own read-only hardware trust code with the random code to generate a hash result. The system controller application transfers the random code and the hash result to transceiver 411 over radio 801 to establish hardware-trust. The system controller application receives another random code and hash result from transceiver 411 over radio 801. The system controller application in baseband circuitry 802 hashes the read-only hardware trust code for transceiver 411 with the other random code to generate a hash result. The system controller application establishes hardware-trust for transceiver 411 when the hash results match. The system controller application stops interactions with WIFI transceivers that fail to establish hardware trust.

Figure 9:
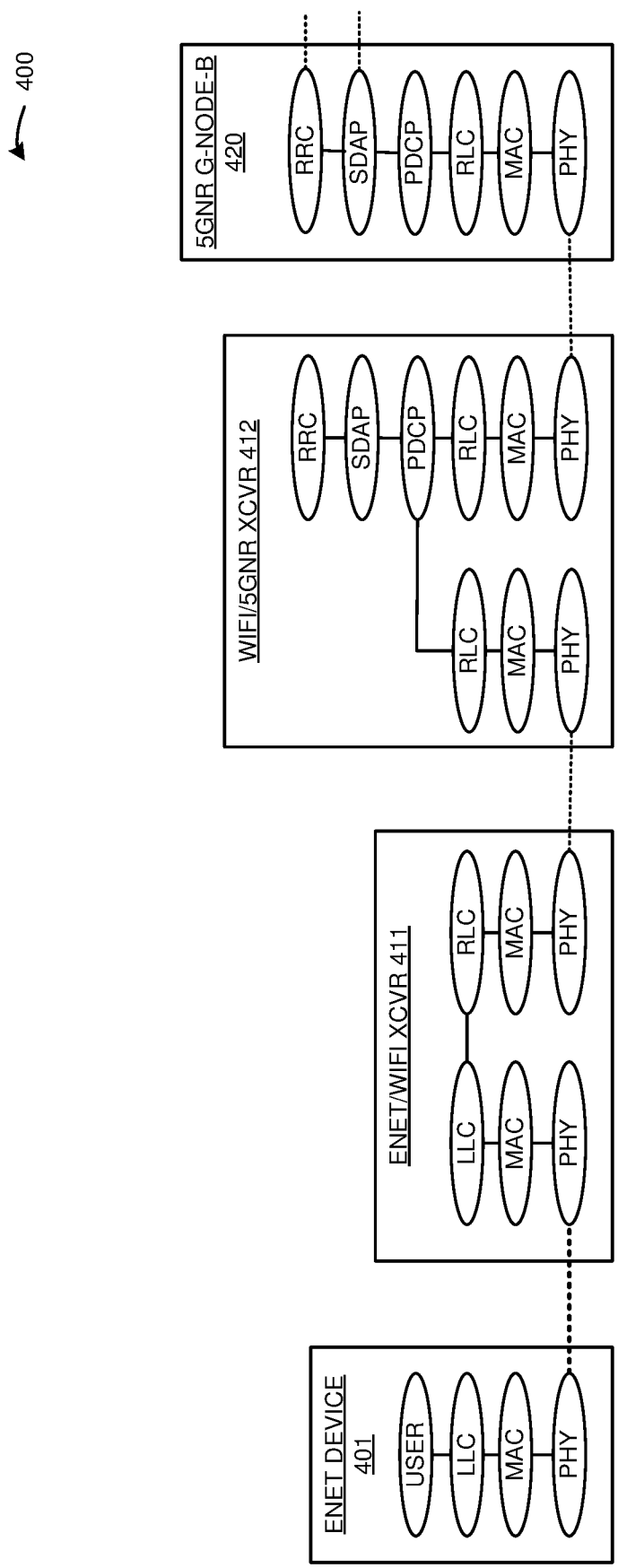
FIG. 9 illustrates the operation of the ENET-WIFI-5GNR system to wirelessly communicate through the wall using WIFI beamforming power control.

FIG. 9 illustrates the operation of ENET-WIFI-5GNR system 400 to wirelessly communicate through the wall using WIFI beamforming power control. In ENET device 401, the user applications (USER) exchange user data with the LLC. The LLC in ENET device 401 exchanges the user data with the LLC in transceiver 411 over their ENET MACs and PHYs. In transceiver 411, the ENET LLC and the WIFI RLC exchange the user data. The WIFI RLC in transceiver 411 wirelessly exchanges the user data with the WIFI RLC in transceiver 412 over their WIFI MACs and PHYs. In transceiver 412, the WIFI RLC exchanges the user data the 5GNR SDAP over the 5GNR PDCP. The 5GNR SDAP in transceiver 412 wirelessly exchanges the user data with the 5GNR SDAP in 5GNR gNodeB 420. The 5GNR RRC in transceiver 412 wirelessly exchanges the 5GNR signaling with the 5GNR RRC in 5GNR gNodeB 420. The 5GNR RRC and SDAP in 5GNR gNodeB 420 exchange 5G signaling and the user data with other 5G network elements.

In particular, the WIFI PHY in transceiver 411 processes received downlink WIFI signals to detect downlink receive power and other signal parameters. The WIFI PHY in transceiver 411 selects a downlink WIFI precoding matrix for transceiver 412 based on the downlink receive power and the other signal parameters. The WIFI PHY in transceiver 411 indicates the selected downlink WIFI precoding matrix to the WIFI PHY in transceiver 412. The WIFI MAC in transceiver 411 indicates the detected downlink receive power to the WIFI MAC in transceiver 412.

The WIFI PHY in transceiver 411 receives and implements an uplink WIFI precoding matrix indicated by the WIFI PHY in transceiver 412. The different uplink WIFI precoding matrices have different uplink beamforming apertures. The WIFI MAC in transceiver 411 receives uplink receive power reports from the WIFI MAC in transceiver 412. The WIFI MAC in transceiver 411 selects an uplink power target based on the reported uplink receive power. The WIFI MAC in transceiver 411 may then reduce the uplink power target if needed to the maximum transmit power for the uplink beamforming aperture of the selected uplink WIFI precoding matrix. The WIFI MAC in transceiver 411 uses the resulting and optimized transmit power level for the uplink transmission.

The WIFI PHY in transceiver 412 processes received uplink WIFI signals to detect uplink receive power and other signal parameters. The WIFI PHY in transceiver 412 selects an uplink WIFI precoding matrix for transceiver 411 based on the uplink receive power and the other signal parameters. The WIFI PHY in transceiver 412 indicates the selected uplink WIFI precoding matrix to the WIFI PHY in transceiver 411. The WIFI MAC in transceiver 412 indicates the detected uplink receive power to the WIFI MAC in transceiver 411. The WIFI PHY in transceiver 412 receives and implements the downlink WIFI precoding matrix indicated by the WIFI PHY in transceiver 411. The different downlink WIFI precoding matrices have different downlink beamforming apertures. The WIFI MAC in transceiver 412 receives downlink receive power reports from the WIFI MAC in transceiver 411. The WIFI MAC in transceiver 412 selects a downlink power target based on the reported downlink receive power. The WIFI MAC in transceiver 412 may then reduce the downlink power target if needed to the maximum transmit power for the downlink beamforming aperture of the selected downlink WIFI precoding matrix. The WIFI MAC uses the resulting and optimized transmit power level for the downlink transmission.

The wireless data network circuitry described above comprises computer hardware and software that form special-purpose network circuitry to wirelessly communicate through a barrier wall using beamforming power control. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to wirelessly communicate through a barrier wall using beamforming power control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless communication system to wirelessly communicate through a physical barrier using beamforming, the method comprising:
   a serving transceiver determining a downlink beamforming matrix indicator and a downlink power indicator and wirelessly transferring the downlink beamforming matrix indicator and the downlink power indicator to a network transceiver;
   the network transceiver wirelessly receiving the downlink beamforming matrix indicator and the downlink power indicator, wirelessly receiving a downlink signal from a wireless communication network, beamforming the downlink signal based on the downlink beamforming indicator, amplifying the downlink signal based on the downlink power indicator, and wirelessly transferring the beamformed and amplified downlink signal to the serving transceiver;
   the serving transceiver wirelessly receiving the beamformed and amplified downlink signal, transferring the downlink signal to a user communication device, detecting downlink signal parameters for the beamformed and amplified downlink signal, determining a new downlink beamforming matrix indicator and a new downlink power indicator based on the downlink signal parameters, and wirelessly transferring the new downlink beamforming matrix indicator and the new downlink power indicator to the network transceiver;
   the network transceiver determining an uplink beamforming matrix indicator and an uplink power indicator and wirelessly transferring the uplink beamforming matrix indicator and uplink power indicator to the serving transceiver;
   the serving transceiver wirelessly receiving the uplink beamforming matrix indicator and the uplink power indicator, wirelessly receiving an uplink signal from the user communication device, beamforming the uplink signal based on the uplink beamforming indicator, amplifying the uplink signal based on the uplink power indicator, and wirelessly transferring the beamformed and amplified uplink signal to the network transceiver; and
   the network transceiver wirelessly receiving the beamformed and amplified uplink signal, wirelessly transferring the uplink signal to the wireless communication network, detecting uplink signal parameters for the beamformed and amplified uplink signal, determining a new uplink beamforming matrix indicator and a new uplink power indicator based on the uplink signal parameters, and wirelessly transferring the new uplink beamforming matrix indicator and the new uplink power indicator to the serving transceiver.

2. The method of claim 1 wherein the serving transceiver determining the new downlink power indicator comprises determining the new downlink power indicator based on the new downlink beamforming matrix indicator.

3. The method of claim 1 wherein the network transceiver determining the new uplink power indicator comprises determining the new uplink power indicator based on the new uplink beamforming matrix indicator.

4. The method of claim 1 wherein the serving transceiver determining the new downlink power indicator comprises determining the new downlink power indicator based on a downlink beamforming aperture associated with the new downlink beamforming matrix indicator.

5. The method of claim 1 wherein the network transceiver determining the new uplink power indicator comprises determining the new uplink power indicator based on an uplink beamforming aperture associated with the new uplink beamforming matrix indicator.

6. The method of claim 1 comprising:
   the network transceiver storing an authentication code, generating a random code, hashing the authentication code and the random code to generate a code hash, and wirelessly transferring the random code and the code hash to the serving transceiver; and
   the serving transceiver storing the authentication code, wirelessly receiving the random code and the code hash from the network transceiver, hashing the authentication code and the random code to generate the code hash, and comparing the received code hash to the generated code hash to authenticate the serving transceiver or block the serving transceiver.

7. The method of claim 1 comprising:
   the serving transceiver storing an authentication code, generating a random code, hashing the authentication code and the random code to generate a code hash, and wirelessly transferring the random code and the code hash to the network transceiver; and
   the network transceiver storing the authentication code, wirelessly receiving the random code and the code hash from the serving transceiver, hashing the authentication code and the random code to generate the code hash, and comparing the received code hash to the generated code hash to authenticate the network transceiver or block the network transceiver.

8. The method of claim 1 comprising:
   the serving transceiver wirelessly broadcasting an uplink pilot signal;
   the network transceiver wirelessly broadcasting a downlink pilot signal;
   the serving transceiver wirelessly scanning and detecting the network transceiver based on the downlink pilot signal; and
   the network transceiver wirelessly scanning and detecting the network transceiver based on the uplink pilot signal.

9. The method of claim 1 wherein:
   the network transceiver wirelessly receiving the downlink signal from the wireless communication network and wirelessly transferring the uplink signal to the wireless communication network comprises wirelessly receiving and transferring Fifth Generation New Radio (5GNR) signals; and
   the network transceiver wirelessly transferring the beamformed and amplified downlink signal to the serving transceiver and wirelessly receiving the beamformed and amplified uplink signal from the serving transceiver comprises the network transceiver wirelessly transferring and receiving Institute of Electrical and Electronic Engineer (IEEE) 802.11 signals.

10. The method of claim 1 wherein:
    the serving transceiver wirelessly receiving the beamformed and amplified downlink signal from the network transceiver and wirelessly transferring the beamformed and amplified uplink signal to the network transceiver comprises the serving transceiver wirelessly transferring and receiving Institute of Electrical and Electronic Engineer (IEEE) 802.11 signals; and the serving transceiver transferring the downlink signal to the user communication device and receiving the uplink signal from the user communication device comprises transferring and receiving IEEE 802.3 signals.

11. A wireless communication system to wirelessly communicate through a physical barrier using beamforming, the wireless communication system comprising:
   a serving transceiver configured to determine a downlink beamforming matrix indicator and a downlink power indicator and wirelessly transfer the downlink beamforming matrix indicator and the downlink power indicator to a network transceiver;
   the network transceiver configured to wirelessly receive the downlink beamforming matrix indicator and the downlink power indicator, wirelessly receive a downlink signal from a wireless communication network, beamform the downlink signal based on the downlink beamforming indicator, amplify the downlink signal based on the downlink power indicator, and wirelessly transfer the beamformed and amplified downlink signal to the serving transceiver;
   the serving transceiver configured to wirelessly receive the beamformed and amplified downlink signal, transfer the downlink signal to a user communication device, detect downlink signal parameters for the beamformed and amplified downlink signal, determine a new downlink beamforming matrix indicator and a new downlink power indicator based on the downlink signal parameters, and wirelessly transfer the new downlink beamforming matrix indicator and the new downlink power indicator to the network transceiver;
   the network transceiver configured to determine an uplink beamforming matrix indicator and an uplink power indicator and wirelessly transfer the uplink beamforming matrix indicator and uplink power indicator to the serving transceiver;
   the serving transceiver configured to wirelessly receive the uplink beamforming matrix indicator and the uplink power indicator, wirelessly receive an uplink signal from the user communication device, beamform the uplink signal based on the uplink beamforming indicator, amplify the uplink signal based on the uplink power indicator, and wirelessly transfer the beamformed and amplified uplink signal to the network transceiver; and
   the network transceiver configured to wirelessly receive the beamformed and amplified uplink signal, wirelessly transfer the uplink signal to the wireless communication network, detect uplink signal parameters for the beamformed and amplified uplink signal, determine a new uplink beamforming matrix indicator and a new uplink power indicator based on the uplink signal parameters, and wirelessly transfer the new uplink beamforming matrix indicator and the new uplink power indicator to the serving transceiver.

12. The wireless communication system of claim 11 wherein the serving transceiver is configured to determine the new downlink power indicator based on the new downlink beamforming matrix indicator.

13. The wireless communication system of claim 11 wherein the network transceiver is configured to determine the new uplink power indicator based on the new uplink beamforming matrix indicator.

14. The wireless communication system of claim 11 wherein the serving transceiver is configured to determine the new downlink power indicator based on a downlink beamforming aperture associated with the new downlink beamforming matrix indicator.

15. The wireless communication system of claim 11 wherein the network transceiver is configured to determine the new uplink power indicator based on an uplink beamforming aperture associated with the new uplink beamforming matrix indicator.

16. The wireless communication system of claim 11 comprising:
   the network transceiver configured to store an authentication code, generate a random code, hash the authentication code and the random code to generate a code hash, and wirelessly transfer the random code and the code hash to the serving transceiver; and
   the serving transceiver configured to store the authentication code, wirelessly receive the random code and the code hash from the network transceiver, hash the authentication code and the random code to generate the code hash, and compare the received code hash to the generated code hash to authenticate the serving transceiver or block the serving transceiver.

17. The wireless communication system of claim 11 comprising:
   the serving transceiver configured to store an authentication code, generate a random code, hash the authentication code and the random code to generate a code hash, and wirelessly transfer the random code and the code hash to the network transceiver; and
   the network transceiver configured to store the authentication code, wirelessly receive the random code and the code hash from the serving transceiver, hash the authentication code and the random code to generate the code hash, and compare the received code hash to the generated code hash to authenticate the network transceiver or block the network transceiver.

18. The wireless communication system of claim 11 comprising:
   the serving transceiver configured to wirelessly broadcast an uplink pilot signal;
   the network transceiver configured to wirelessly broadcast a downlink pilot signal;
   the serving transceiver configured to wirelessly scan and detect the network transceiver based on the downlink pilot signal; and
   the network transceiver configured to wirelessly scan and detect the network transceiver based on the uplink pilot signal.

19. The wireless communication system of claim 11 wherein:
   the network transceiver is configured to wirelessly transfer and receive Fifth Generation New Radio (5GNR) signals; and
   the network transceiver is configured to wirelessly transfer and receive Institute of Electrical and Electronic Engineer (IEEE) 802.11 signals.

20. The wireless communication system of claim 11 wherein:
   the serving transceiver is configured to wirelessly transfer and receive Institute of Electrical and Electronic Engineer (IEEE) 802.11 signals; and
   the serving transceiver is configured to transfer and receive IEEE 802.3 signals.

* * * * *